June 18, 1957 H. THÜRLINGS 2,796,365
DISSOLVING MACHINE FOR USE IN CONNECTION WITH CANDY MAKING
Filed July 21, 1954 3 Sheets-Sheet 1

INVENTOR.
Hermann Thürlings
BY
Patent Agent

June 18, 1957 H. THÜRLINGS 2,796,365
DISSOLVING MACHINE FOR USE IN CONNECTION WITH CANDY MAKING
Filed July 21, 1954 3 Sheets-Sheet 2
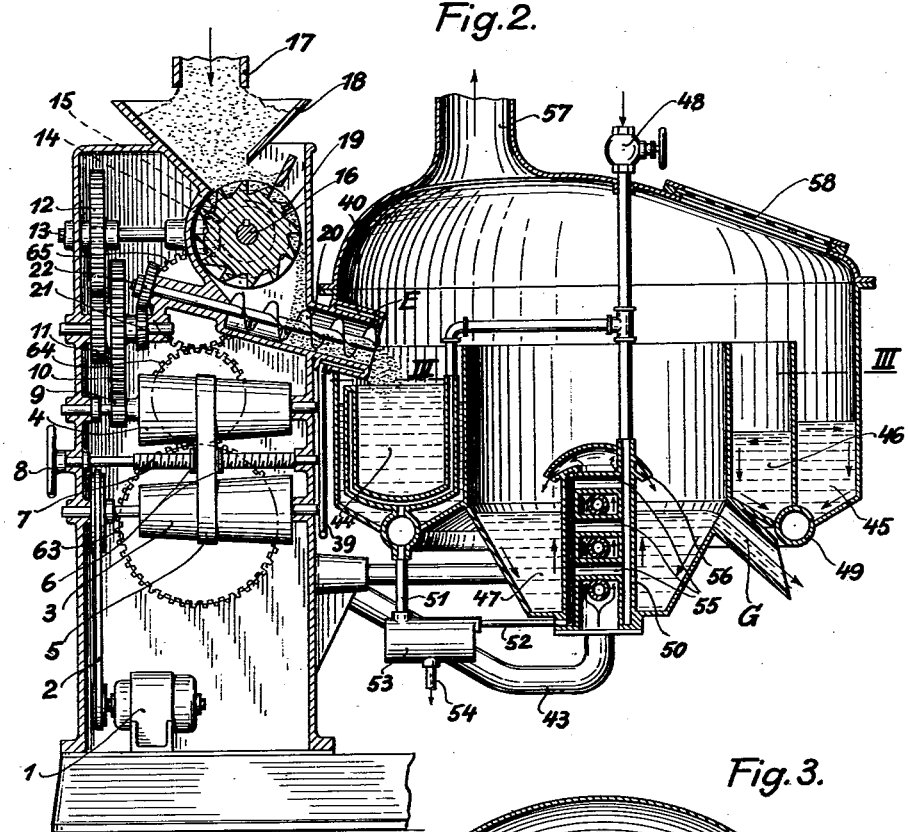
Fig.2.
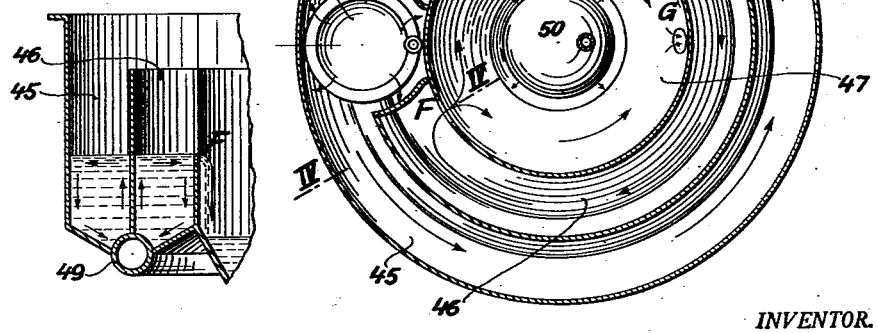
Fig.3.
Fig.4.
INVENTOR.
Hermann Thürlings
BY
Patent Agent.

United States Patent Office 2,796,365
Patented June 18, 1957

2,796,365
DISSOLVING MACHINE FOR USE IN CONNECTION WITH CANDY MAKING

Hermann Thürlings, Viersen, Rhineland, Germany

Application July 21, 1954, Serial No. 444,761

Claims priority, application Germany July 27, 1953

7 Claims. (Cl. 127—22)

The present invention relates to candy making and, more particularly, concerns a dissolving machine for the candy industry.

The sugary or sacchariferous mass for making candies is cooked in machines into which a solution of sugar, water and syrup is supplied in a continuous process. Instead of syrup also invert sugar solution may be employed. In contrast to the steadily working cooking machines, the solution has heretofore been prepared in batches in heated kettles with or without stirring mechanism. The ingredients of the solution, namely sugar, water and syrup, are weighed for each batch or are determined by quantitative regulation or dosing. This work is time-consuming and requires much manual work. In addition thereto, the preparation of the solution in batches has the following disadvantages: in each hot solution of sugar, water and syrup, a portion of the cane sugar inverts; the inversion is among others dependent on the time. When preparing the solution in batches in connection with a continuous supply to the cooking machine, the solution is from the start to the end of the further processing exposed to a high temperature over different periods of time. Accordingly, the proportion of invert sugar varies in the final product.

The syrup in the solution becomes more or less brownish with increasing temperature and also with time. The solution will be the clearer, the less the syrup is maintained at high temperature. Therefore, when processing the solution in batches, at the end of the further processing of the batch, the solution is somewhat darker than at the beginning of the processing.

It is, therefore, an object of the present invention to provide an arrangement which will overcome the above mentioned drawbacks.

It is a further object of this invention to provide a dissolving machine for use in connection with the making of candies which will make it possible to prepare the sugary solution and feed the same into a cooking machine in a continuous process so as to obtain a more uniform product throughout the operation of the machine.

It is still another object of this invention to provide a dissolving machine of the above mentioned type which will make it possible to vary the mixing ratio whenever desired.

Still another object of this invention consists in the provision of a dissolving machine of the above mentioned type which will allow a continuous control of the total supply of the ingredients of the solution so as to bring the working rhythm of the dissolving machine into conformity with that of the cooking machine.

These and other objects and advantages of the invention will appear more clearly from the following specification in connection with the accompanying drawings in which:

Fig. 2 is a vertical section through the machine of Fig. 1.

Fig. 3 is a horizontal section through Fig. 2 taken along the line III—III thereof.

Fig. 4 is a vertical section through Fig. 3 taken along the line IV—IV thereof.

General arrangement

Figure 1:
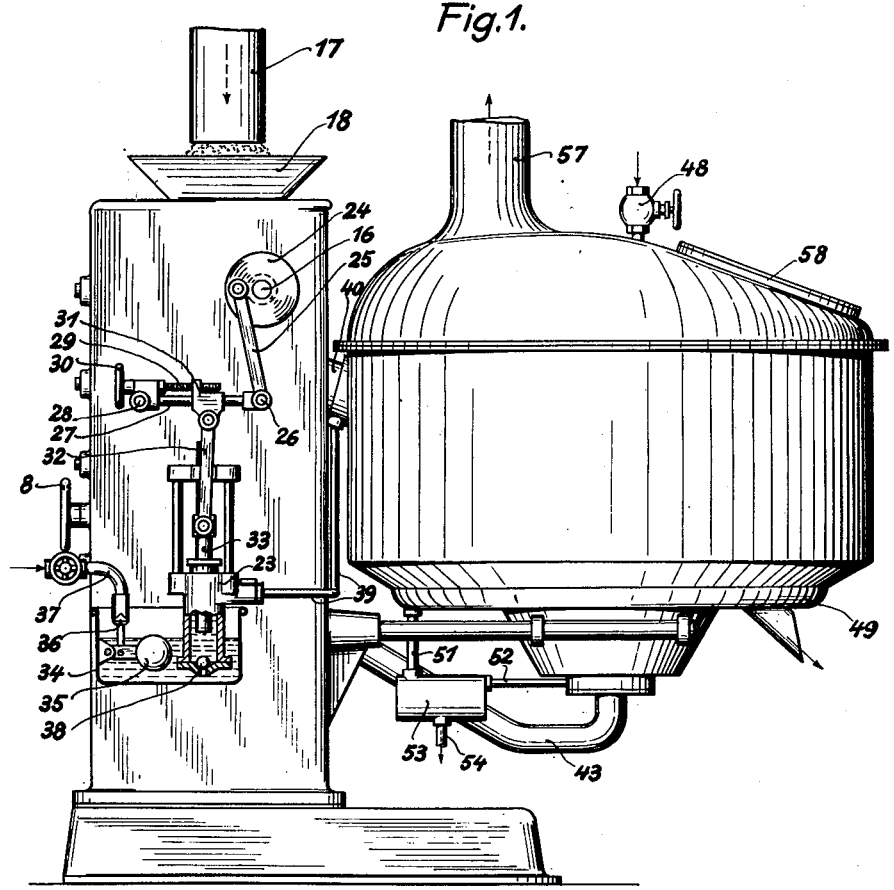
Fig. 1 represents a front view of a dissolving machine according to the invention while showing the water reservoir in section.

The dissolving machine according to the present invention comprises feeding or conveying means arranged to measure or dose the ingredients of the solution while they are passing through the machine in a continuous process and to feed the said ingredients into a dissolving kettle which is subdivided into individual chambers or dissolving sections. Sugar, water and syrup are measured or dosed while being supplied in a continuous process.

Furthermore, there are preferably provided additional devices arranged to vary the mixing ratio to any desired extent. In addition thereto, the total supply of the ingredients of the solution may be controlled in a uniform manner so that the working rhythm of the dissolving machine can be brought into synchronism with the rhythm of the cooking machine. The dissolution itself is likewise effected in a steady flow, while the syrup is added only at the end of the dissolving section in order to obtain a particularly clear solution.

Structural arrangement

Referring now to the drawings in detail, the arrangement comprises a driving motor 1 (Fig. 2) which through a V-belt 2 drives a transmission adapted for infinitely varying the total speed. For the sake of simplicity, a conical drum transmission 3, 4 is shown which includes a connecting belt 5 adapted to be displaced by means of a belt guide 6 and a spindle 7. The adjustment of the speed is effected by means of a hand wheel 8. The movement is conveyed from the drum 4 to the main shaft 16 by means of the gear 9, the gear train 10, 11, 12, shaft 13, and a pair of bevel gears 14, 15 (located behind the sectional plane). This main shaft 16 drives the measuring or dosing devices for sugar, water and syrup. In order to be able to vary the mixing ratio of these ingredients of the solution, it is necessary between the shaft 16 and said measuring devices to provide means which will allow to vary the deliveries of the measuring devices. It will be sufficient if two of the three measuring devices will be operable so as to control the quantities delivered thereby.

According to the specific embodiment shown in the drawing, the sugar-measuring device is rigidly connected with the shaft 16. From a storage container, sugar is supplied to the machine through a pipe 17. From the pipe 17, the sugar drops into a funnel or hopper 18 beneath which there is arranged the measuring wheel 19 which is connected to the main shaft 16. From the measuring wheel 19, the sugar drops upon a conveyor worm 20 and by means of the latter is conveyed to the dissolving kettle. The worm 20 is driven by the gear 10 through the intervention of the pair of bevel gears 21, 22. The worm 20 is arranged between the measuring wheel 19 and the dissolving kettle in order to prevent that steam or vapor forming when boiling the sugar solution will pass to the measuring wheel 19, humidify the latter and thus will affect the precision of the measuring operation.

The main shaft 16 (Fig. 1) also drives the water pump 23. A link or rocker arm is provided for controlling the supply of water for the solution. More specifically, mounted on the shaft 16 is a crank disc 24 which operates the connecting rod 25. The connecting rod 25 is by means of a pivot 26 pivotally connected to one end of the coulisse or rocker arm 27, whereas the other end of the coulisse is oscillatable about the stationary pivot 28. A sliding block 31 slidably mounted on the coulisse 27 is adjustable thereon by means of a spindle 29 and a hand wheel 30 connected thereto. Pivotally connected to said sliding block 31 is a connecting rod 32 for the piston 33 of the water pump 23. It will thus be evident, that by displacing the sliding block 31, the piston stroke and thus the quantity of water to be delivered can be varied. In order to assure that the degree of delivery of the water pump remains indedendent of the pressure in the feeding conduit or water main 37, a water reservoir 34 is provided between the water main 37 and the water pump 23. The water reservoir 34 comprises a float 35 and a valve 36 controlled by said float. By means of said float 35 and valve 36, the supply of water from the water main 37 may be so controlled that the water level in the water reservoir 34 remains substantially constant. The water pump 23 is so arranged that its suction valve 38 is located below the water level. The solvent water is pumped through the pressure conduit 39 into the dissolving kettle of the machine and enters the dissolving kettle at E (see Fig. 2) whereupon it mixes with the sugar. Prior to being discharged at E, the water flows around and cools the worm casing 40. This is a further provision which prevents steam or vapor from the kettle to pass to the sugar measuring wheel 19. Inasmuch as a small space must remain between the conveyor worm 20 and the worm casing 40 in order to prevent the worm from seizing in the worm casing, it will be obvious that steam or vapor from the kettle might pass through said space if the casing were not cooled. Due to the cooling, the said steam or vapor condenses along the casing wall and mixes as dissolvent water with the sugar in the conveyor worm.

Figure 5:
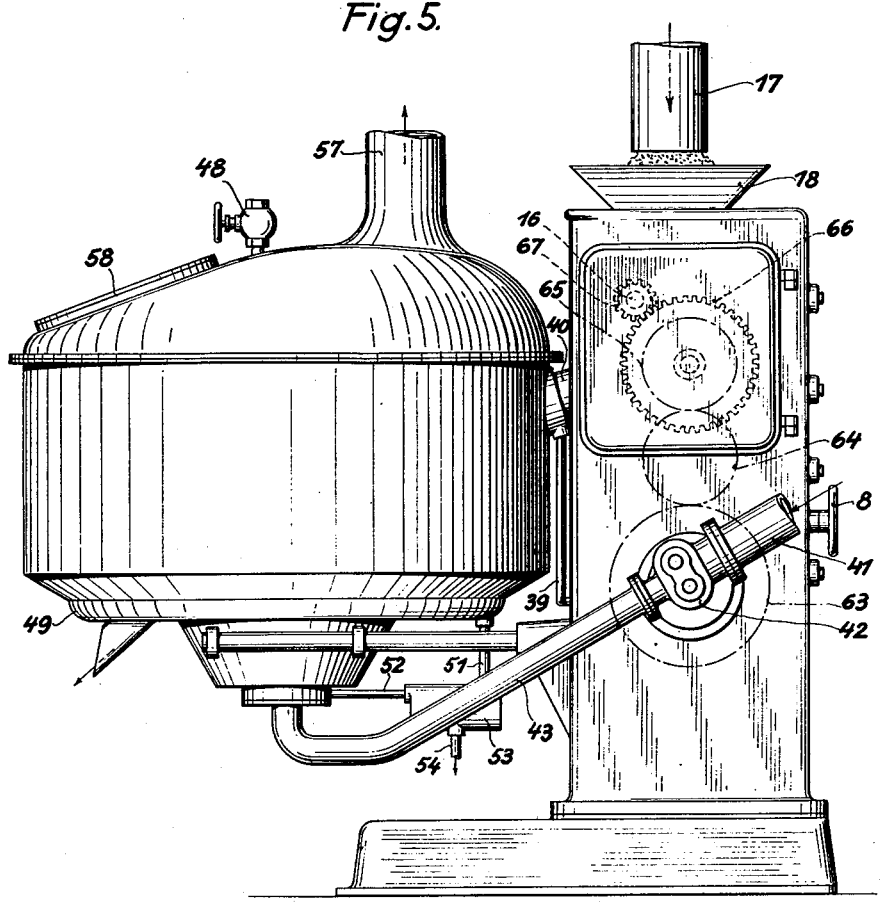
Fig. 5 is a back view of the dissolving machine shown in Fig. 1.

Syrup is conveyed to the syrup pump 42 (Fig. 5) through the conduit 41. The syrup pump 42 is driven by the main shaft 16 through the intervention of the gear train 63, 64, 65 and the bevel gears 66, 67. In order to be able to adjust the quantities of syrup delivered by the syrup pump according to a desired ratio with regard to the supply of sugar, the gears 66, 67 are exchangeable for gears with other transmission ratios. The syrup is pumped through conduit 43 into the dissolving kettle of the machine.

The dissolving kettle may be provided with or without a stirring mechanism. The sugar is dissolved in the dissolving water while the latter is passing in a continuous stream. After the sugar has been dissolved, the syrup is added. In order to prevent that non-dissolved sugar crystals remain in the solution, the dissolving kettle comprises one or a plurality of dissolving sections which are very long with regard to the cross section of said dissolving sections or the dissolving kettle comprises individual chambers through which the solution must flow in succession.

Figs. 2, 3 and 4 illustrate a dissolving kettle which operates without stirring mechanism but with long dissolving sections. The dissolving kettle illustrated in Figs. 2, 3 and 4 comprises a double wall preheater 44, an outer dissolving section 45, an inner dissolving section 46, the admixing chamber for syrup, and a syrup preheater 50. The dissolving kettle is heated with steam. The steam supply is effected through the control valve 48 to the syrup preheater 50 and also to the sugar preheater 44 and through the latter to the heating pipe 49. The conduits 51 and 52 for the condensed water lead into the condensed water collector 53. The condensed water is conveyed to a condensed water separator through the conduit 54.

The sugar mixed with dissolvent water drops into the preheater 44 in which the sugar with the water is brought up to boiling temperature. During this operation, the sugar dissolves to such an extent that the sugar with the water forms a liquid in which the crystals are not yet dissolved. Instead of the double wall preheater, also other means may be employed which are suitable for bringing sugar and solvent water up to cooking temperature. When the preheater is filled, the liquid overflows into the outer dissolving section 45 and then in the direction of the arrows into the inner dissolving section 46. During this passage of the liquid, the liquid is maintained in boiling condition. By unilaterally arranging the heating pipe 49 with regard to the cross sections of the dissolving sections, the liquid remains in turbulent movement during its flow (see arrows shown in the cross section of the dissolving sections). In this way it is assured that the not yet dissolved sugar crystals will remain in suspension and thus will certainly be dissolved.

At F the solution passes into the admixing chamber 47 for the syrup. The syrup preheater 50 protrudes into said chamber 47. The syrup is preheated to such an extent that it becomes highly fluid and easily mixes with the solution. The syrup preheater may for instance consist of a double wall heated pipe through which the syrup is passed. In order to increase the heating surface, heated transverse pipes 55 are additionally provided around which the syrup flows. The preheated syrup is discharged through an annular gap 56 and drops into a solution which also at this place is in turbulent motion so that a thorough intermixing will be obtained. The final sugar, water and syrup solution overflows at G and is discharged through a pipe for any desired further processing or candy manufacture. The steam or vapors which may result during the dissolving operation are discharged through the connecting piece or pipe 57. The dissolving process may be watched through a window 58.

It is, of course, understood that the present invention is, by no means, limited to the particular constructions shown in the drawings but also comprises any modifications within the scope of the appended claims.

What I claim is:

1. A dissolving machine for preparing a solution of the ingredients sugar, water, and syrup for use in the candy making industry, which comprises in combination: a dissolving container having a plurality of compartments arranged for communication with each other and including a first compartment arranged to receive sugar and water, a second compartment in form of a relatively narrow and long channel arranged to receive a mixture of sugar and water from said first compartment, a third compartment serially arranged to said second compartment and likewise of relatively narrow and long shape for receiving a sugar-water mixture from said second compartment, said third compartment being substantially concentrically arranged with regard to said second compartment, syrup supply means arranged substantially concentrically with regard to said second and third compartments, a fourth compartment surrounding said syrup supply means and substantially surrounded by said third compartment while communicating with the latter, said fourth compartment being arranged to be fed with syrup from said syrup supply means, and heating means for heating at least some of said compartments.

2. A dissolving machine for preparing a solution of the ingredients sugar, water, and syrup for use in the candy making industry, which comprises in combination: a preheater arranged to receive sugar and water, a dissolving container housing said preheater and comprising a relatively long and narrow channel-shaped outer dissolving section arranged to receive sugar and water from said preheater, an inner relatively long and narrow channel-shaped dissolving section communicating with said outer dissolving section and having its major portion surrounded thereby, said inner and outer dissolving sections being serially arranged and substantially concentrically with regard to each other, syrup preheater means arranged for connection with syrup supply means and located within said container and substantially concentrically with regard to said dissolving sections, a syrup mixing chamber located within said container intermediate said syrup preheater means and said inner dissolving section and arranged to receive syrup from said syrup preheater means, said mixing chamber also communicating with said inner dissolving section to receive dissolved sugar therefrom, and heater means for heating sugar and water preheater and said syrup preheater means.

3. A dissolving machine according to claim 2, in which the outer dissolving section is arranged to receive the overflow only from said preheater for sugar and water.

4. A dissolving machine for preparing a solution of the ingredients sugar, water, and syrup for use in the candy making industry, which comprises in combination: a preheater arranged to receive sugar and water, a dissolving container housing said preheater and comprising a relatively long and narrow channel-shaped outer dissolving section arranged to receive sugar and water from said preheater, an inner relatively long and narrow channel-shaped dissolving section communicating with said outer dissolving section and having its major portion surrounded thereby, said inner and outer dissolving sections being serially arranged and substantially concentrically with regard to each other, delivery syrup means located within said container and substantially concentrically with regard to said dissolving sections, a syrup mixing chamber located within said container intermediate said syrup delivery means and said inner dissolving section and arranged to receive syrup from said syrup delivery means, said mixing chamber also communicating with said inner dissolving section to receive dissolved sugar therefrom, and heater means for heating said sugar and water preheater and said inner and outer dissolving sections.

5. A dissolving machine for preparing a solution of the ingredients sugar, water, and syrup for use in the candy making industry, which comprises in combination: a dissolving container including a first compartment to receive sugar and water, a relatively long and narrow channel-shaped outer dissolving section arranged to receive sugar and water from said first compartment, an inner relatively long and narrow channel-shaped dissolving section serially arranged with regard to said outer dissolving section and communicating therewith, said inner and outer sections being substantially concentrically arranged with regard to each other and having a bottom inclined toward each other so as to form an angle with each other, heat conveying conduit means arranged along the intersecting line of the bottoms of said channel sections and forming a portion of said bottoms, syrup delivery means located within said container and substantially concentrically with regard to said dissolving sections, and a second compartment surrounding said syrup delivery means for receiving syrup therefrom and being substantially surrounded by said inner dissolving section.

6. A dissolving machine for preparing a solution of the ingredients sugar, water, and syrup for use in the candy making industry, which comprises in combination: a dissolving container having a plurality of compartments arranged for communication with each other and including a first compartment arranged to receive sugar and water, hopper means arranged to receive sugar, measuring wheel means arranged below said hopper means for receiving sugar therefrom and meting out quantities of sugar to be conveyed to said first compartment, conveyor worm means arranged below said measuring wheel means and arranged for conveying meted out quantities of sugar to said first compartment, water conveying means arranged to receive water and convey the same to said first compartment, said water conveying means passing around the delivery end of said worm means for cooling the same, a second compartment in form of a relatively narrow and long channel arranged to receive a mixture of sugar and water from said first compartment, a third compartment serially arranged to said second compartment and likewise of relatively narrow and long shape for receiving a sugar-water mixture from said second compartment, said third compartment being substantially concentrically arranged with regard to said second compartment, syrup supply means arranged substantially concentrically with regard to said second and third compartments, a fourth compartment surrounding said syrup supply means and substantially surrounded by said third compartment while communicating with the latter, said fourth compartment being arranged to be fed with syrup from said syrup supply means, and heating means for heating at least some of said compartments.

7. A dissolving machine for preparing a solution of the ingredients sugar, water, and syrup for use in the candy making industry, which comprises in combination: a dissolving container having a plurality of compartments arranged for communication with each other and including a first compartment arranged to receive sugar and water, first feeding means operable to feed sugar to said first compartment, second feeding means including pump means for feeding water to said first compartment, a second compartment in form of a relatively narrow and long circularly-shaped channel arranged to receive a mixture of sugar and water from said first compartment, a third compartment serially arranged to said second compartment and likewise of relatively narrow and long shape for receiving a sugar-water mixture from said second compartment, said third compartment being substantially concentrically arranged with regard to and surrounded by said second compartment, syrup supply means arranged substantially concentrically with regard to said second and third compartments, third feeding means operable to feed syrup to said syrup supply means, a main driving shaft common to all of said feeding means for conveying driving power thereto, means respectively associated with said feeding means and arranged to bring about a variation in the feeding speed of said feeding means regardless of the driving speed of said main shaft, a fourth compartment surrounding said syrup supply means and substantially surrounded by said third compartment and arranged for communication with the latter, said fourth compartment being adapted to be fed with syrup from said syrup supply means, and heating means for heating at least some of said compartments.

References Cited in the file of this patent

UNITED STATES PATENTS

| | | |
|---|---|---|
| 334,972 | Newhall | Jan. 26, 1886 |
| 733,175 | Engel | July 7, 1903 |
| 2,022,205 | Kramer | Nov. 26, 1935 |
| 2,098,591 | Neuman | Nov. 9, 1937 |
| 2,206,237 | Roberts | July 2, 1940 |
| 2,233,243 | Burns | Feb. 25, 1941 |
| 2,610,929 | Brieghel-Muller | Sept. 16, 1952 |

FOREIGN PATENTS

| | | |
|---|---|---|
| 165,499 | Switzerland | Feb. 1, 1934 |
| 9,295 | Great Britain | of 1911 |